United States Patent [19]

Eilertsen

[11] Patent Number: 4,697,164

[45] Date of Patent: Sep. 29, 1987

[54] INCREMENTALLY INDEXING LINEAR ACTUATOR

[76] Inventor: John L. Eilertsen, 7300 Deep Run, Birmingham, Mich. 48010

[21] Appl. No.: 897,511

[22] Filed: Aug. 18, 1986

[51] Int. Cl.$^4$ ............................................. H01F 7/08
[52] U.S. Cl. .................................... 335/253; 335/266; 335/268
[58] Field of Search ............... 335/253, 254, 259, 266, 335/267, 268, 279; 310/12, 14, 30

[56] References Cited

U.S. PATENT DOCUMENTS

| | | | |
|---|---|---|---|
| 3,206,656 | 9/1965 | Musgrave | 335/253 |
| 3,882,333 | 5/1975 | DeWeese | 310/14 |
| 4,623,860 | 11/1986 | Baker et al. | 335/253 X |

*Primary Examiner*—George Harris

*Attorney, Agent, or Firm*—Barnes, Kisselle, Raisch, Choate, Whittemore & Hulbert

[57] ABSTRACT

An electromagnetic linearly indexing actuator in which a shaft is mounted for linear motion in the direction of its axis. A pair of electromagnetic stator assemblies are carried in fixed position coaxially spaced from each other in the direction of the shaft axis. Each stator assembly has an associated armature which is slidably carried by the shaft, and a spring for urging each armature away from its associated stator. A latch is pivotally mounted at one end to each armature eccentrically of the shaft axis and has a central aperture which embraces the shaft. The stator assemblies are sequentially and alternately energized, so that the latches alternately grip and move the shaft during motion of the associated armatures. The shaft is returned to its initial position by a return spring, or by an opposing pair of armature and stator assemblies.

36 Claims, 11 Drawing Figures

INCREMENTALLY INDEXING LINEAR ACTUATOR

The present invention is directed to actuators for obtaining linear motion at an output shaft or the like, and more particularly to linear actuators for obtaining incrementally indexed motion over long strokes in one or both axial directions.

BACKGROUND AND OBJECTS OF THE INVENTION

Linear indexers, also known as linear stepper motors, have heretofore been proposed in the art for obtaining precisely incrementally controlled linear motion at an output shaft or the like. In particular, electromagnetic actuators of the described character have comprised a shaft carrying a series of magnets and cooperating with a series of stator assemblies for electromagnetically incrementing or indexing the magnets and shaft through the stator assemblies. Linear indexers of this type are expensive to fabricate and assemble. Moreover, the length of stroke is necessarily limited by the number of magnets and stator assemblies, with cost and size increasing rapidly with stroke length. Holding power, which is a function of electromagnetic attraction between the magnets and energized stator assemblies, has severely limited application of this technology.

It is a general object of the present invention to provide a linear actuator, particularly an actuator for obtaining incrementally indexed linear motion, which is inexpensive to manufacture and implement, which can be readily and accurately controlled over an unlimited length of stroke, and which obtains high holding power with limited energy input. A further and more specific object of the invention is provide an electromagnetic linerally indexing actuator of reduced cost and size, and suitable for use in precision control of electronic functions in an automotive vehicle, such as precision control of the pintle in an EGR valve of a vehicle emission system, or in power-assisted electronic vehicle applications such as power steering or braking.

SUMMARY OF THE INVENTION

In general, the foregoing and other objects of the invention are obtained by providing a linear actuator which includes a shaft mounted for linear motion in the direction of its axis. A disc is slidably mounted on the shaft and carries a pivotal latching mechanism which has a central aperture embracing the shaft. Mechanism is provided for incrementally moving the disc in the direction of the shaft axis, during which motion the latch is pivoted with respect to the shaft axis so that the aperture which embraces the shaft effectively grips the shaft and moves the shaft axially conjointly with the disc. A spring, specifically a pair of spring washers, surround the shaft between the indexer and disc, with the concave side facing the disc and the convex side engaging the indexer for applying uniform force on the central portion of the indexer and thereby assisting the pivoting and shaft-gripping action thereof. An abutment is positioned on a side of the latch opposed to the disc, and the spring washers urge the latch against the abutment in the de-energized or deactivated positions of the disc and latch. The latch surface opposing the abutment is sloped to accommodate pivotal motion of the latch during initial disc motion without interference with the abutment.

In an actuator for obtaining incrementally indexed linear motion, a pair of such discs and latches, with associated abutments and spring washers, are mounted in tandem along the shaft. The discs are alternately energized, with one disc remaining energized for latching the shaft in position while the other disc is de-energized, returned to its initial position, and then re-energized for incrementing shaft position. Mechanism for returning the shaft to its initial position may comprise a coil spring against which the discs and latches operate, or a second pair of oppositely acting discs and latches for incrementing shaft position in the opposite direction.

In the preferred embodiments of the invention, the discs comprise armatures in a pair of electromagnetic actuator assemblies positioned serially of the shaft. A coil spring urges each armature/disc and its associated latch against the opposing latch abutment. The coils of the stator assemblies are connected to energizing electronics which are responsive to pulsed input command signals for alternately energizing the stator coils. The coil-drive electronics include facility for sensing current in each stator coil, and for energizing the other coil when the actuator associated with the first coil moves to its fully-energized position. In this way, maximum velocity consistent with shaft load is obtained. In an alternative embodiment of the invention, a fluid actuator includes pistons having the latch-carrying discs forming parts thereof. The fluid cylinder is coupled to a controlled fluid supply for incrementally activating the pistons and indexing the shaft in either direction.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
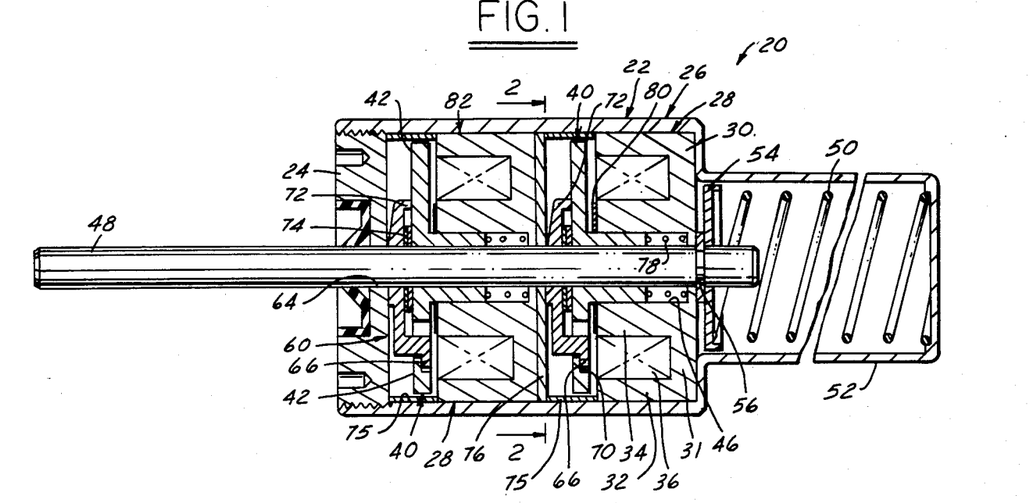
FIG. 1 is a sectional view bisecting an electromagnetic linearly indexing actuator in accordance with one embodiment of the present invention.
Figures 2, 3:
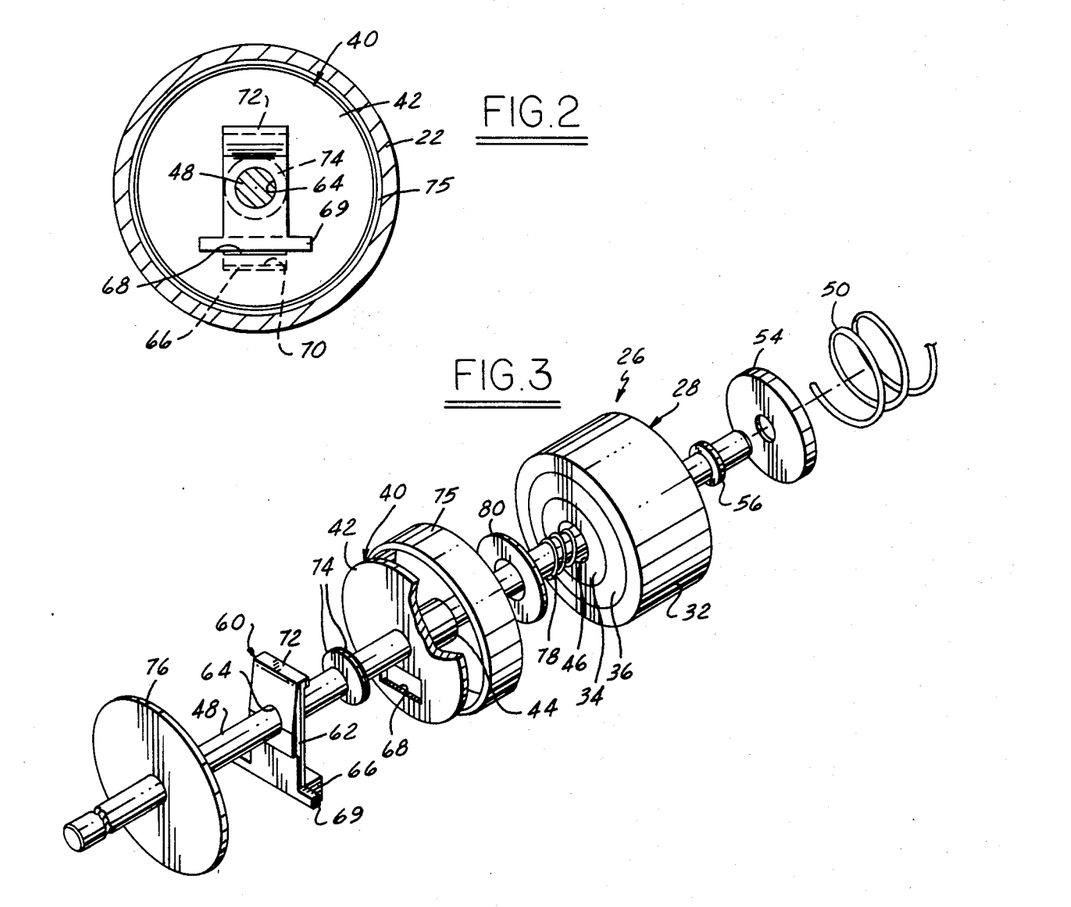
FIG. 2 is a sectional view taken substantially along the line 2—2 in FIG. 1.
FIG. 3 is an exploded perspective view of a portion of the actuator illustrated in FIG. 1.

FIGS. 1-3 illustrate an electromagnetic linearly indexing actuator 20 in accordance with a first embodiment of the invention as comprising a generally cylindrical housing 22 having an end cap 24 threaded thereon. A first electromagnetic actuator 26 comprises a stator body 30 having a flat base 31 with a pair of annular radially spaced poles 32, 34 integrally axially projecting therefrom. A stator coil 36 is disposed in the annular groove or channel formed between poles 32, 34 and base 31, coil 36 and stator body 30 thus forming a stator assembly 28. An electromagnetic armature 40 comprises a generally flat disc 42 of electromagnetic construction having a central boss 44 which projects into a central recess or pocket 46 in stator body 30. A shaft 48 slidably coaxially extends through armature boss 44, and is carried by a central aperture in stator body 30, and by an aperture in end cap 24, for sliding motion axially of housing 22. A coil spring 50 is positioned within a closed depression 52 in housing 22 coaxially with shaft 48, and is captured between the base of depression 52 and an opposing retainer 54 which loosely surrounds the end of shaft 48. A grip ring 56 is positioned in a groove on shaft 48 between retainer 54 and stator body 30 so as to capture shaft 48 in assembly.

A latch 60 includes a generally rectangular central body 62 having a circular aperture 64 which slidably surrounds and embraces shaft 48. A first end of latch 60 includes a stepped foot 66 which projects through a generally tangentially oriented rectangular opening 68 positioned in armature disc 42 eccentrically of the axis of shaft 48. The end of foot 66 is seated within a ledge 70 (FIG. 1) on the innerface of disc 42 adjacent to opening 68. A pair of wings 69 project laterally of latch body 62 and cooperate with foot 66 to hold latch 60 in position. The opposing or second end of latch 60 includes an axially oriented lip 72 which engages the opposing face of armature disc 42. The axial dimension between the opposing faces of lip 72 and wings 69 is the same as or only slightly greater than that between the corresponding faces of ledge 70 and disc 42, so that latch 60 may pivot away from disc 42 about the corners of wings 69, while wings 69 and lip 72 prevent axial motion of the latch. The radial dimension of opening is sufficient to permit insertion and radial sliding of ledge 70. Foot 66, ledge 70 and lip 72 are dimensioned such that aperture 64 is coaxial with shaft 48, and shaft 48 is freely slidable therewithin, when lip 72 and foot 66 are firmly engaged with the opposing sides of armature disc 40. A pair of spring washers 74 are captured between latch 60 and the opposing face of armature disc 42, with the concave side of washers 74 facing disc 42 and the convex or crowned sides of washers 74 facing and engaging latch 60.

Stator body 30 is seated within housing 22 against an axial shoulder adjacent to depression 52. An annular spacer 75 surrounds armature 40 in assembly, and spaces an abutment washer 76 from stator body 30. A coil spring 78 is positioned within stator pocket 46 and engages armature boss 44 to urge armature 40 away from stator assembly 28, with latch 60 in facing engagement with abutment 76. A shim 80 is positioned between armature disc 42 and stator body 30 so as to prevent direct abutting engagement therebetween. The surface of latch 60 opposing abutment washer 76 slopes away from abutment washer 76 toward latch lip 72. A second electromagnetic actuator 82 is positioned within housing 22 surrounding shaft 48 and is held therewithin by end cap 24 and spacer 75. Actuator 82 is identical in all respects to actuator 26, and the individual components thereof are identified by correspondingly identical reference numerals in FIG. 1. In actuator 82, coil spring 78 urges latch 60 into abutment with the opposing surface of end cap 24.

Shims 80, spacers 75, end cap 24 and abutment washer 76, are of non magnetic construction, such as brass. Housing 22 is likewise of non-magnetic construction, such as aluminum. Stator bodies 30 and armatures 40 are of suitable magnetically permeable material, such as steel. Latches 60 and shaft 48 are of hardened steel construction. Latch aperture 64 is dimensioned for close sliding fit over shaft 48. For example, for a shaft 48 having a diameter of 0.2492 to 0.2495 inches, aperture 64 may have a diameter of 0.2496 to 0.2498 inches. The axial thickness of latch central body 62 at aperture 64 is not greater than two-thirds the diameter of aperture 64.

In general operation, either actuator 26, 82 may be energized by directing current through its associated coil 36. Upon such energization of actuator 26, armature 40 is attracted to and begins to move toward stator body 30 against the force of spring 78. However, spring washers 74 urge latch 60 away from abutment 76 causes pivoting of latch 60 about wings 69. Such pivoting action of latch 60 is assisted by springs 74 and permitted by the sloping latch surface opposing abutment 76. Convex orientation of spring washers 74 engaging latch 60 help maintain uniform force. Pivoting or cocking of latch 60 firmly grips shaft 48, so that shaft 48 moves conjointly with armature 40 and latch 60 for the remainder of armature motion against the force of spring 50.

With actuator 26 energized, and with its associated latch 60 checking return motion of shaft 48, actuator 82 is then energized. Shaft 48 is again gripped by the latch 60 of actuator 82, and the shaft is indexed another step or increment against spring 50. It will be appreciated that latch 60 of actuator 26 will collapse against associated spring washers 74 and not retard such further motion of shaft 48. Indeed, actuator 26 may now be de energized, so that its associated armature 40 and latch 60 are returned by spring 78 to the normal or deenergized positions of FIG. 1. Shaft 48 is thus indexed against spring 50 by alternate energization of actuators 26, 82. Each index increment is a function of axial air gap, shaft diameter, latch thickness and aperture diameter, and radial latch dimension. These parameters may be selected empirically. It is also possible to provide differing air gaps, and therefore differing increments, for rapid and slow approach capabilities. When both actuators are de energized, latches 60 are likewise deactivated by abutment with washer 76 and end cap 24, and shaft 48 is returned to its initial position by spring 50.

Figure 9:
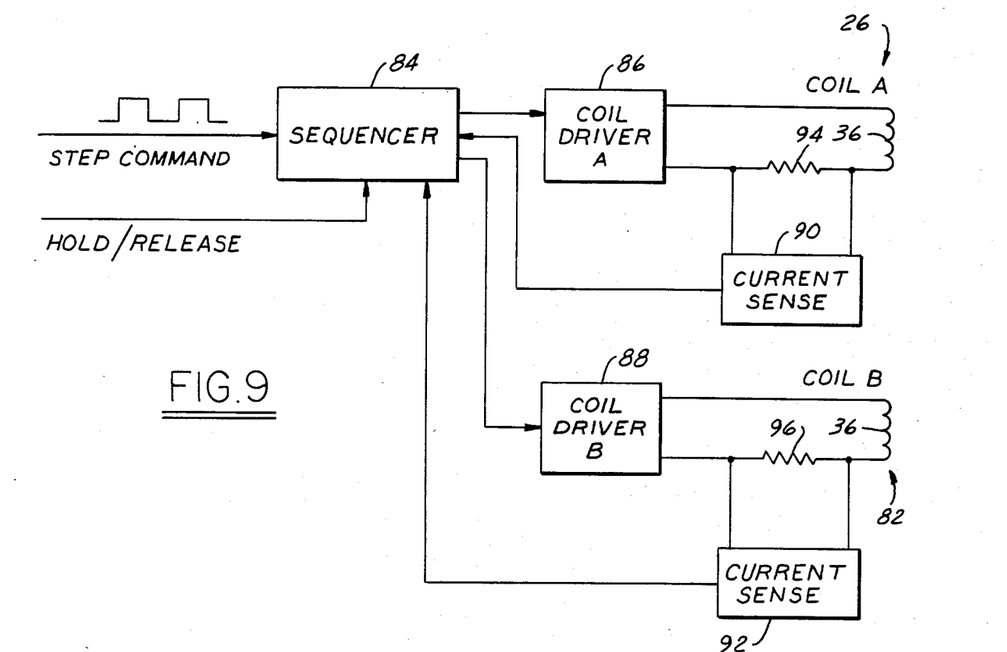
FIG. 9 is a functional block diagram of actuator drive electronics in accordance with one embodiment of the invention.
Figure 11:
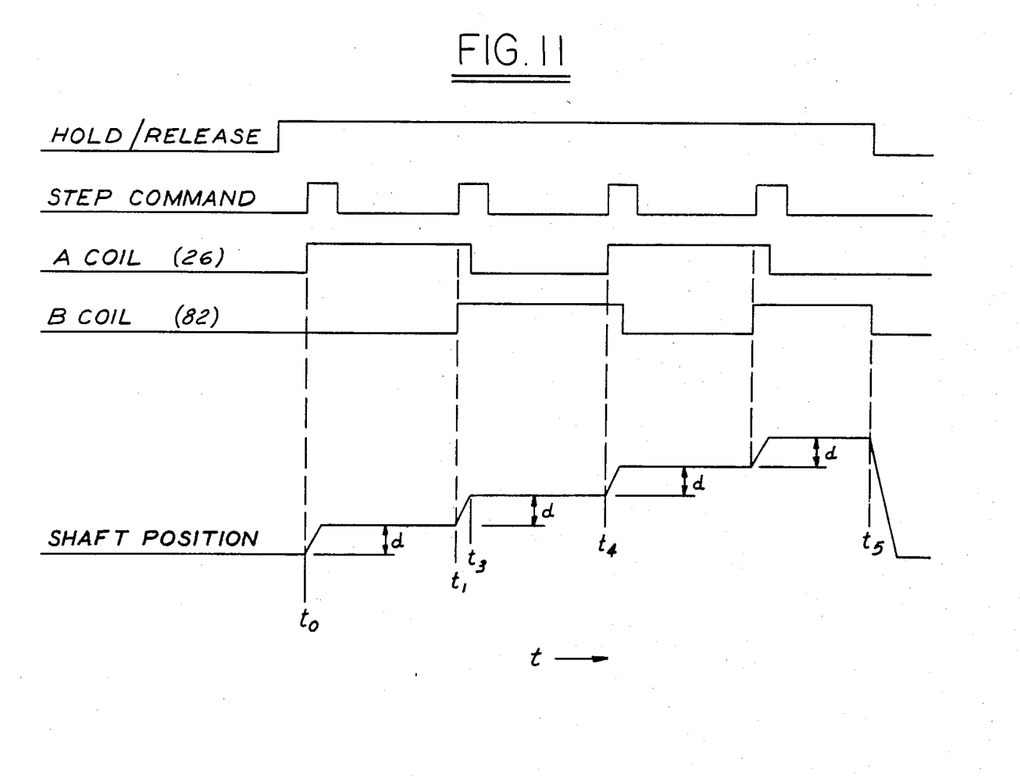

FIG. 9 is a functional block diagram of electronics for energizing actuator 20 as previously described. Sequencing electronics 84 receives pulsed input STEP COMMAND signals from a suitable control (not shown), and also receives a HOLD/RELEASE input for enabling operation of the actuator. Sequencing electronics 84 provides output signals to a pair of coil drivers 86, 88, which selectively apply energizing current to the coils 36 of actuators 26 and 82. Current sensing electronics 90, 92 are connected across resistors or the like 94, 96 in the current paths to coils 36 for sensing current therein, and provide corresponding signals to sequencing electronics 84. Referring to FIGS. 1, 9 and 11, it will be assumed that actuator 20 is initially in the home position, with shaft 48 at an initial or zero position prior to indexing to the right (FIG. 1) or in the positive direction (FIG. 11). A HOLD/RELEASE enabling input is fed to sequencing electronics 84, followed by an initial STEP COMMAND pulse at time t0. Coil 36 of actuator 26 is then energized so as to draw armature 40 toward stator 38, or to the right as illustrated in FIG. 1, against the force of armature return spring 78. Latch 60 pivots about wings 69 as armature 40 initially moves, with such pivoting action being enhanced by operation of spring washers 74. As a result of such pivoting motion, opposed edges of aperture 64 grip shaft 48 and pull shaft 48 to the right in FIG. 1 by an incremental distance d which is a function of the initial air gap between armature disc 42 and stator poles 32, 34.

At a subsequent time t1 (FIG. 1), a second STEP COMMAND pulse is received by sequencing electronics 84, to energize coil 36 of actuator 82. However, sequencing electronics 84 maintains current in coil 36 of actuator 26 during motion of the armature and indexer of actuator 82, and during consequent motion of shaft 48, for the second increment d illustrated in FIG. 11. Such motion of shaft 48 is not impeded by actuator 26 because shaft 48 is free to slide to the right in FIG. 1. However, maintenance of actuator 26 in the energized state insures that shaft 48 will remain locked against leftward motion under force of spring 50. The current to the coil of actuator 26 is then terminated at time t3, and the actuator armature and latch are returned to the rest position illustrated in FIG. 1 under force of armature spring 78. Actuator 26 may then be reenergized by a third STEP COMMAND pulse at time t4, and the sequence of pulses to the respective coils repeated alternately until the final desired shaft position is obtained. When it is thereafter desired to return shaft 48 to the normal or home position of FIG. 1, the HOLD-/RELEASE command is terminated at time t5, de-energizing all actuators and permitting shaft 48 to return to the home position under force of spring 50.

To obtain the most rapid advance available under varying axial load on shaft 48, the embodiment of the invention illustrated in FIG. 9 senses coil current and enables switching of sequencing electronics 84 to the opposing coil when complete armature motion is sensed. More particularly, and refering to FIG. 10, stator current initially increases as an exponential function with time until a first discontinuity or dip 100, which takes place when motion of armature 40 initially begins and latch 60 grips shaft 48. It will be noted that the time delay t6 depends solely on inertia of armature 40 and latch 78, as well as the forces exerted by spring 78 and spring washer 74, and thus does not depend upon shaft load. Thereafter, stator current continues to increase exponentially with time until a second discontinuity 102, which indicates that armature 40 has moved to the fully-energized position adjacent to stator 26, and shaft 48 has been incremented accordingly. It will be noted that the time t7 between initial shaft pickup at 100 and completion of incremental shaft motion at 102 depends upon shaft load, with a low-load situation being illustrated in solid lines in FIG. 10 and a high-load situation being illustrated in phantom. In either case, further increase in current in the stator coil beyond discontinuity 102 is essentially wasted because the armature and shaft have completed motion. Thus, in accordance with an important feature of the present invention, the second depression 102 is sensed at current sensing electronics 90, 92, and sequencing electronics 84 is advised that motion is completed and that the other stator coil may be de-energized and returned to its initial position preparatory to subsequent energization. It will also be appreciated that greater current is required to obtain incremental motion at an armature, latch and shaft than is required to hold the armature and latch in the shaft-locking position. Thus, current may be reduced to a lower level 104 (FIG. 10) to hold the shaft while the other actuator is de-energized preparatory to indexing.

Figure 4:
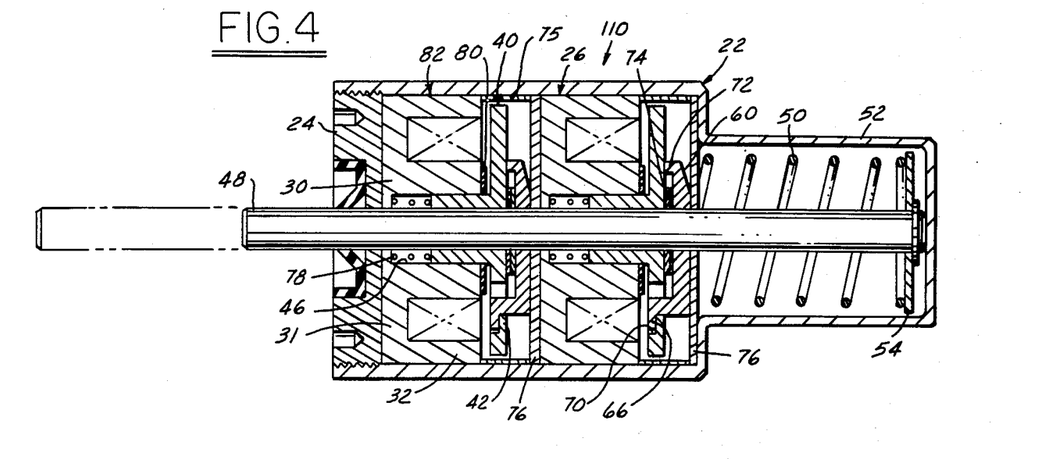
FIG. 4 is a sectional view similar to that of FIG. 1 and illustrating a second embodiment of the invention.
Figure 5:
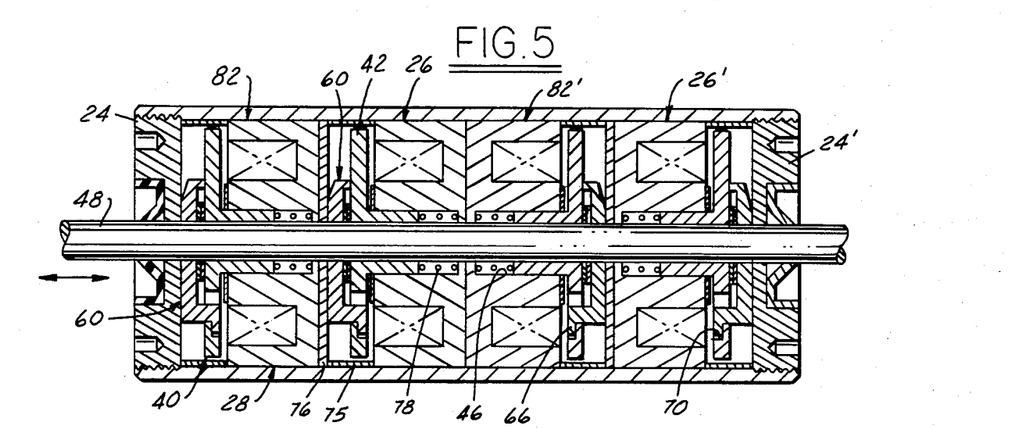
FIG. 5 is a sectional view similar to those of FIGS. 1 and 4, and illustrating a third embodiment of the invention.

FIG. 4 illustrates a modified actuator 110 in accordance with the invention wherein the actuators 26, 82 are axially oriented oppositely to the configuration of FIG. 1 so as to move shaft 48 to the left rather than to the right, with spring 50 thus urging shaft 48 to the right to the zero or home position illustrated in solid lines in FIG. 4. Construction and operation of actuator 110 in FIG. 4 are otherwise identical to that hereinabove discussed in detail in conjunction with FIGS. 1–3 and 9–11. FIG. 5 illustrates an important embodiment 112 of the invention, which essentially combines the stator and armature structures of FIGS. 1 and 4 while eliminating the function of return spring 50. In FIG. 5, actuators 26, 82 function when energized to index shaft 48 to the right, while actuators 82' and 26' function as in FIG. 4 to index shaft 48 to the left. Thus, shaft 48 may be incrementally indexed in either direction through selective energization of the various actuators 26, 82, 26' and 82'. It will be noted that the stroke of shaft 48 in the embodiment of FIG. 5 is essentially unlimited in either direction.

Figure 6:
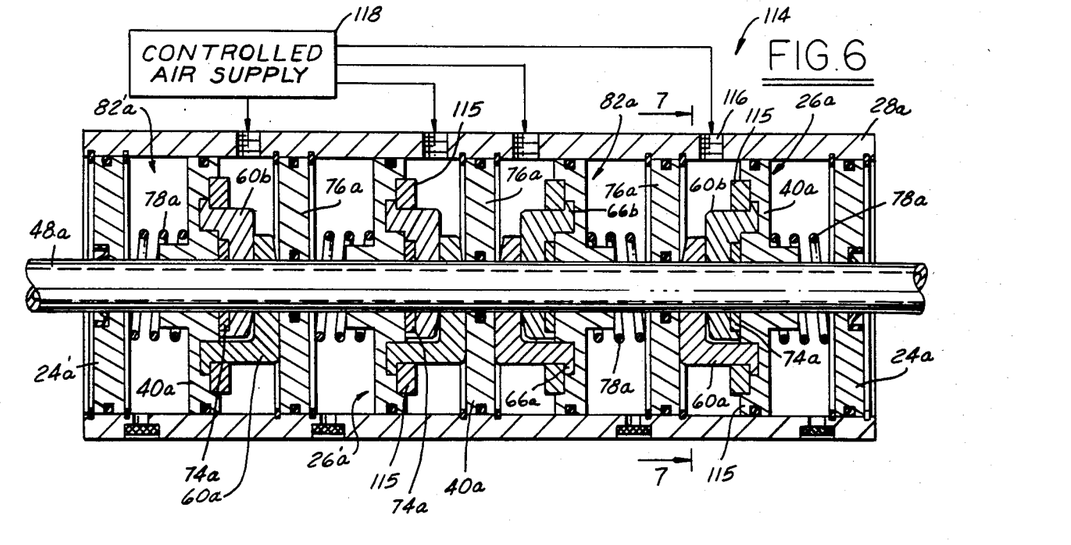
FIG. 6 is a sectional view similar to that of FIG. 5 and illustrating a fluid-operated embodiment of the invention.
Figures 7, 8, 10:
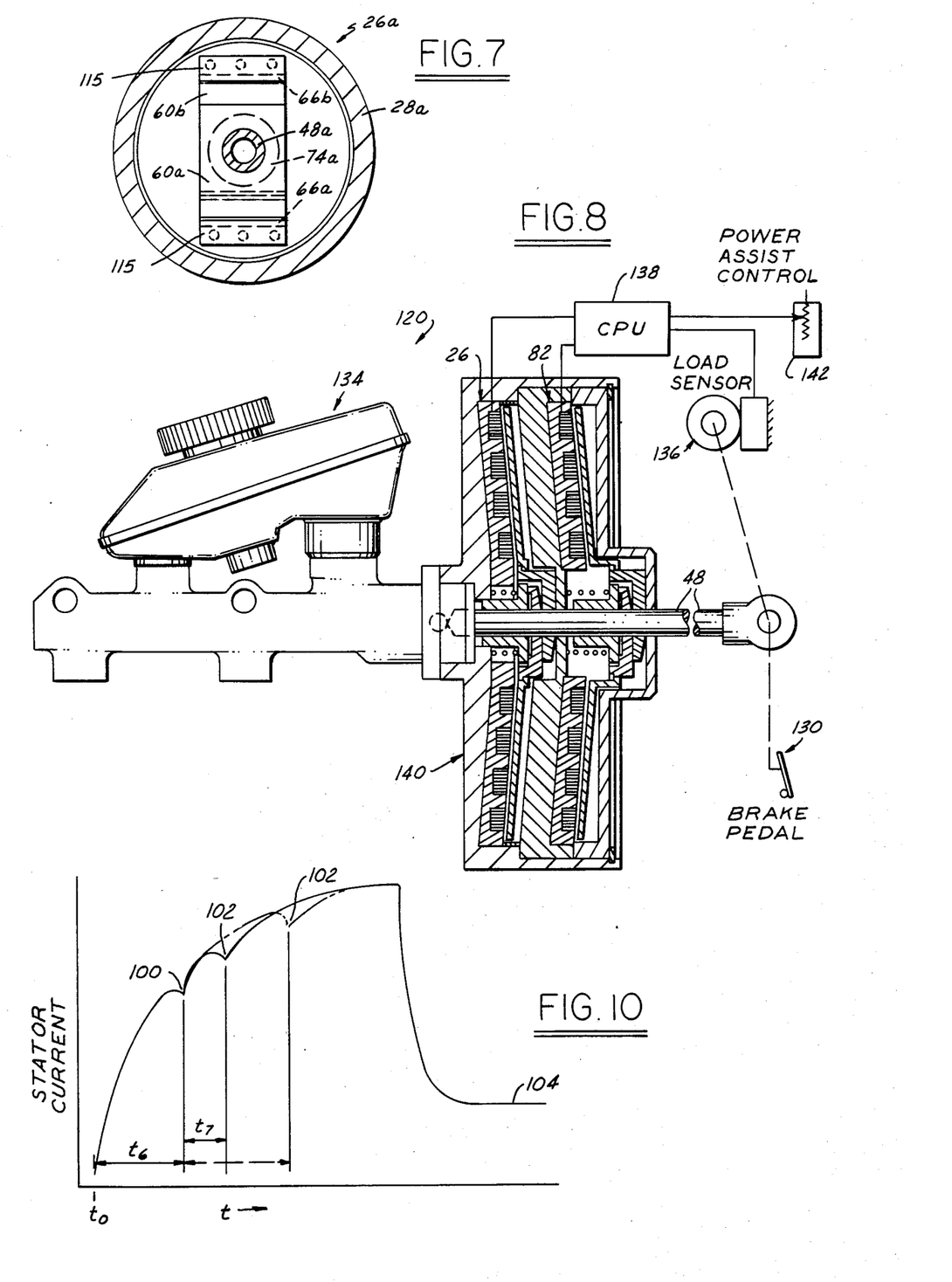
FIG. 7 is a sectional view taken substantially along the line 7—7 in FIG. 6.
FIG. 8 is a fragmentary, partially schematic view of an electromagnetic actuator of the type illustrated in FIG. 1 in a power-assist brake application.
FIGS. 10 and 11 are graphic illustrations useful in describing operation of the electronics of FIG. 9.

FIGS. 6 and 7 illustrate a linearly indexing fluid actuator 114 in accordance with the invention, with construction and operation of the embodiment of FIGS. 6 and 7 being the fluid analogy of construction and operation in FIG. 5. To facilitate understanding, fluid actuators in the embodiment of FIG. 6 are identified by reference numerals corresponding to those of FIG. 5 followed by the suffix "a". Actuator 26a comprises a piston 40a having a periphery sealingly slidable within a cylinder 28a. Piston 40a is biased by a coil spring 78a to a position wherein latch 60a is in facing engagement with an abutment 76a. It will be noted in FIG. 6 that a second latch 60b diametrically opposed to latch 60a is carried by piston 40a and embraces shaft 48 gripping power on shaft 48a thus being doubled. Spring washer 74a bias latches 60a, 60b outwardly with respect to piston 40a. Because piston 40a must be fluid-tight, feet 66a, 66b of latches 60a, 60b are pivotally captured by keepers 115 welded to piston 40a. Cylinder 28a has a port 116 coupled to a controlled air (or oil) supply 118. Fluid actuators 82a, 26a' and 82a' are essentially similar in construction to actuator 26a, with all cylinders 28a being formed by a common housing.

To move shaft 48a to the right, fluid is fed into port 116 so as to move piston 40a against spring 78a and pivot latches 60a, 60b. These latches thus grip shaft 48a and move the shaft to the right by an increment corresponding to motion of piston 40a against spring 78. Fluid pressure at actuator 26a is maintained, while pressure is then increased within actuator 82a, so as to move shaft 48a a further increment to the right. Thereafter, pressure at actuator 28a is reduced and piston 40a is moved to the left by spring 78a, while pressure at actuator 82a is maintained. Thus, shaft 48a is incrementally indexed to the right by alternately energizing fluid actuators 26a, 82a in a manner analogous to that hereinabove discussed. The same action in the opposite direction is obtained by sequential alternate activation of actuators 26a' and 82a'.

FIG. 8 illustrates an application of the invention in an electronically assisted power brake system 120. This configuration could be expanded to include separate electronically controlled linear indexers at each wheel, incorporating a driven wedge device or the like, to achieve a full four-wheel electronically-assisted electric brake system. Operator pressure on a brake pedal 130 is transmitted by the shaft 48 to the hydraulic master cylinder assembly 134. At the same time, brake pressure is sensed by a load sensor 136 and fed to a vehicle CPU 138. CPU 138 provides appropriately sequenced alternating signals to the actuators 26, 82 of the power assist assembly 140 for indexing shaft 48 in the braking direction, and thereby assisting the operator. It will be appreciated that electronically assisted power braking in accordance with the application of FIG. 8 overcomes many problems associated with hydraulic brake assistance in conventional vehicles. For example, loss of vehicle power has no effect upon brake assistance because electrical power remains available from the vehicle battery. Furthermore, the vehicle manufacturer may provide for variable power assistance, such as through an operator adjustment 142. The principals of the invention have also been applied to precision control of the pintel in a vehicle EGR valve, overcoming problems associated with vacuum control in vehicles of conventional construction.

The invention claimed is:

1. A linear actuator which comprises:
a shaft having a central axis,
first means mounting said shaft for linear motion in the direction of said axis,
second means carried by said shaft for sliding motion in the direction of said axis,
latching means having a first end pivotally mounted to said second means eccentrically of said axis, a central portion which extends laterally across said axis along one face of said second means and has an aperture which embraces said shaft, and a second end free to move with respect to said second means, and
third means carried in fixed position on said first means and operatively coupled to said second means for moving said second means along said axis in a direction opposed to said one face, motion of said second means pivoting said latching means at said one end to grip said shaft at said aperture and move said shaft conjointly with said second means.

2. The actuator set forth in claim 1 further comprising first spring means positioned between said central portion of said latching means and said one face of said second means for pivotally urging said latching means away from said second means into gripping engagement with said shaft.

3. The actuator set forth in claim 2 wherein said first spring means comprises a spring washer having a convex side engaging said latching means and a concave side facing said second means encircling said shaft.

4. The actuator set forth in claim 2 further comprising abutment means carried by said first means in fixed position opposed to said one face of said second means, and second spring means for urging said second means in the direction of said one face, with said latching means abutting said abutment means and said first spring means compressed between said latching means and said second means.

5. The actuator set forth in claim 4 wherein said central portion of said latching means has a surface opposed to said abutment means which slopes away from said abutment means from said aperture to said second end.

6. The actuator set forth in claim 5 wherein said second end of said latching means includes means for engaging said one face of said second means for maintaining said aperture coaxial with said shaft when said latching means is in abutment with said abutment means.

7. The actuator set forth in claim 6 wherein said latching means comprises first and second diametrically opposed latching means each having a first end pivotally mounted to said second means, a central portion with an aperture embracing said shaft, and a second end, said first spring means being captured between said second means and the opposing one of said first and second latching means.

8. The actuator set forth in claim 4 wherein said second means comprises a disc armature of electromagnetic construction, and wherein said third means comprises an electromagnetic stator assembly for drawing said armature in the direction of said axis against said second spring means.

9. The actuator set forth in claim 4 wherein said first means means comprises a fluid cylinder, said second means comprises a piston carried for motion within said cylinder, and wherein said third means comprises means for supplying fluid under pressure to said cylinder for moving said piston in the direction of said axis against said second spring means.

10. A linearly indexing actuator which comprises:
a shaft having a central axis,
first means mounting said shaft for linear motion in the direction of said axis,
second and third means slidably carried by said shaft for motion in the direction of said axis,
first and second latching means respectively coupled to said second and third means, each of said first and second latching means having a first end pivotally mounted to an associated second and third means eccentrically of said axis, a central portion which extends laterally across said axis along one face of the associated said second and third means and has an aperture which embraces said shaft, and a second end free to move with respect to the associated said second and third means, said one face of said second and third means facing in the same direction axially of said shaft, and
means carried in fixed position with respect to said first means and operatively coupled to said second and third means for selectively moving said second and third means along said axis in a first axial direction opposed to said one faces, motion of each of said second and third means pivoting the associated said first and second latching means at said one ends to grip said shaft and move said shaft conjointly with said second and third means in the direction of said axis.

11. The actuator set forth in claim 10 further comprising first spring means positioned between each said central portion of said first and second latching means and the associated one face of said second and third means for pivotally urging said latching means away from said second and third means into gripping engagement with said shaft.

12. The actuator set forth in claim 11 wherein said first spring means comprises spring washers having a convex side engaging the associated latching means and a concave side facing the associated said second and third means encircling said shaft.

13. The actuator set forth in claim 11 further comprising abutment means carried by said first means in fixed position opposed to said one faces of both said second and third means, and second spring means for urging each of said second and third means in the direction of the associated one face, with the associated latching means abutting said abutment means and said first spring means compressed between said latching means and the associated said second and third means.

14. The actuator set forth in claim 13 wherein said central portion of each said first and second latching means has a surface opposed to said abutment means which slopes away from said abutment means from said aperture to said second end.

15. The actuator set forth in claim 14 wherein said second end of each said latching means includes means for engaging said one face of the associated said second and third means for maintaining said aperture coaxial with said shaft when said latching means is in abutment with said abutment means.

16. The actuator set forth in claim 10 further comprising means for moving said shaft in a second axial direction opposed to said first axial direction.

17. The actuator set forth in claim 16 wherein said means for moving said shaft in said second direction comprises a spring coupled between said first means and said shaft for urging said shaft in said second direction.

18. The actuator set forth in claim 16 wherein said means for moving said shaft in said second direction comprises:
fourth and fifth means identical to said second and third means and slidably carried by said shaft, with said one faces of said fourth and fifth means facing oppositely of said one faces of second and third means,
third and fourth latching means identical to said first and second latching means and respectively coupled to said fourth and fifth means, and
means carried in fixed position with respect to said first means for selectively moving said fourth and fifth means in said second direction.

19. An electromagnetic linearly indexing actuator which comprises:
a shaft having a central axis and means mounting said shaft for linear motion in the direction of said axis,
first and second stator means carried in fixed position with respect to said mounting means and coaxially spaced from each other in the direction of said axis,
first and second armature means slidably carried by said shaft respectively adjacent to said first and second stator means,
first spring means positioned between each of said stator means and the associated said armature means for urging said armature means away from said stator means, each of said stator means including means for electromagnetically energizing said stator means and attracting the associated armature means in a first direction against the force of the associated first spring means, and
first and second latching means respectively carried by said first and second armature means, each said latching means comprising a first end pivotally coupled to the associated said armature means, a central portion which extends across said axis along one face of the associated said armature means and has an aperture which embraces said shaft, and a second end remote from said first end and free to move with respect to the associated said armature means, said one faces of said first and second armature means facing in the same direction axially of said shaft.

20. The actuator set forth in claim 19 further comprising abutment means carried by said mounting means in fixed position with respect to said stator means and in opposition to said one face of said armature means, each of said first spring means urging the associated said latching means into abutment with said abutment means.

21. The actuator set forth in claim 20 wherein each of said armature means comprises a disc having an opening spaced from said axis and a recess in a face of said disc opposed to said one face, and wherein each of said latching means comprises a stepped leg projecting through said opening in the associated said disc and a pair of wings laterally extending tangentially along said one face.

22. The actuator set forth in claim 21 wherein said aperture in said central portion of each said latching means comprises a circular opening capturing said shaft.

23. The actuator set forth in claim 22 wherein said second end of each said latching means includes a lip for axially engaging said one face of the associated said armature for maintaining said central portion of said latching means spaced from said one face and for maintaining said aperture coaxial with said shaft when said latching means is in abutment with said abutment means.

24. The actuator set forth in claim 23 further comprising second spring means disposed between each said latching means and the associated said one face of said discs for pivotally urging the associated said latching means away from said disc.

25. The actuator set forth in claim 24 wherein each of said second spring means comprises a spring washer having a convex side engaging the associated said latching means and a concave side facing the associated said disc.

26. The actuator set forth in claim 25 wherein each said central portion of said latching means has a surface opposed to the associated said abutment means which slopes away from said abutment means from said aperture to said second end.

27. The actuator set forth in claim 25 wherein said shaft and apertures are of circular cross section at preselected diameter, and where each said central portion of said latching means has an axial thickness which is not greater than two-thirds of said diameter of said apertures.

28. The actuator set forth in claim 26 wherein each said stator means comprises a stator body with a flat base having a central aperture slidably supporting said shaft, annular radially spaced poles integrally axially projecting from said base, and coil means positioned between said poles for electromagnetically energizing said stator means.

29. The actuator set forth in claim 28 wherein each said stator body has a central pocket, and wherein each said armature disc has an integral boss which projects into an associated said stator pocket slidably surrounding said shaft, each said first spring means being captured by a said boss in an associated said pocket.

30. The actuator set forth in claim 19 further comprising means for selectively alternately energizing said first and second stator means for incrementally indexing said shaft in said first direction opposed to said one faces of said armature means.

31. The actuator set forth in claim 30 wherein said energizing means comprises means responsive to pulsed input signals for alternately energizing said first and second stator means.

32. The actuator set forth in claim 31 wherein said means responsive to said pulsed input signals comprises means for sensing activation of each said stator means and motion of the corresponding said armature for deactivating the other said stator means and releasing the other said armature means only when said motion has been completed.

33. The actuator set forth in claim 32 wherein each of said stator means comprises a stator body and coil means for energizing said stator means, and wherein said sensing means comprises means responsive to current in each said coil means for indicating completion of motion of the associated said armature.

34. The actuator set forth in claim 19 further comprising means for moving said shaft in a second direction opposed to said first direction.

35. The actuator set forth in claim 34 wherein said shaft moving means comprises second spring means coupled between said shaft-mounting means and said shaft for urging said shaft in said second direction.

36. The actuator set forth in claim 34 wherein said shaftmoving means comprises:

third and fourth stator means carried in fixed position with respect to said shaft-mounting means and coaxially spaced from each other in the direction of said axis, third and fourth armature means slidably carried by said shaft respectively adjacent to said third and fourth stator means, said third and fourth stator means being disposed and oriented in opposition to said first and second stator means, second spring means positioned between each of said third and fourth stator means and the associated said third and fourth armature means for urging said third and fourth armature means away from the associated said third and fourth stator means, each of said third and fourth stator means including means for electromagnetically energizing the associated said stator means and attracting the associated said armature means in said second direction against the force of the associated said second spring means, and third and fourth latching means respectively carried by said third and fourth armature means, each of said third and fourth latching means comprising a first end pivotally coupled to the associated said armature means, a central portion which extends across said axis along one face of the associated said armature means and has an aperture which embraces said shaft, and a second end remote from said first end and free to move with respect to the associated said armature means, said one faces of said third and fourth armature means facing in said first direction.

* * * * *